(12) United States Patent
Fukunaga (10) Patent No.: US 10,675,901 B2
(45) Date of Patent: Jun. 9, 2020

(54) THERMAL TRANSFER RECORDING MEDIUM

(71) Applicant: TOPPAN PRINTING CO., LTD., Tokyo (JP)

(72) Inventor: Godai Fukunaga, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 130 days.

(21) Appl. No.: 15/953,696

(22) Filed: Apr. 16, 2018

(65) Prior Publication Data

US 2018/0229523 A1    Aug. 16, 2018

Related U.S. Application Data

(63) Continuation of application No. PCT/JP2016/081457, filed on Oct. 24, 2016.

(30) Foreign Application Priority Data

Nov. 2, 2015    (JP) ................ 2015-215565

(51) Int. Cl.
*B41M 5/395* (2006.01)
*B41M 5/44* (2006.01)
(Continued)

(52) U.S. Cl.
CPC ............. *B41J 31/12* (2013.01); *B41J 2/325* (2013.01); *B41J 31/06* (2013.01); *B41M 5/395* (2013.01);
(Continued)

(58) Field of Classification Search
CPC .......... B41M 5/395; B41M 5/42; B41M 5/44; B41M 2205/30; B41M 2205/38
See application file for complete search history.

(56) References Cited

U.S. PATENT DOCUMENTS

2015/0132510 A1    5/2015    Fukunaga et al.

FOREIGN PATENT DOCUMENTS

| JP | H07-102746 B2 | 11/1995 |
| JP | 2005-231354 A | 9/2005 |
| JP | 2012-196912 A | 10/2012 |

OTHER PUBLICATIONS

Extended European Search Report issued in corresponding European Application Ser. No. 16861957.5, dated Jun. 11, 2019.

(Continued)

*Primary Examiner* — Gerard Higgins (74) *Attorney, Agent, or Firm* — Foley & Lardner LLP (57) ABSTRACT

A thermal transfer recording medium that is capable of dealing with the requirement for an increase in thermal transfer printing speed, and high density and high quality of a thermally transferred image, capable of preventing the occurrence of abnormal transfer at high temperature and high humidity, and capable of improving transfer sensitivity in printing. A thermal transfer recording medium includes a heat-resistant lubricating layer on one surface of a base material, and an undercoat layer and a dye layer in that order on the other surface of the base material. The undercoat layer includes a copolymer of a polyester having a sulfonic acid group and an acrylic polymer having at least one of a glycidyl group and a carboxyl group, polyvinylpyrrolidone, and an oxazoline group-containing polymer. A binder resin of the dye layer is an acid-modified polyvinyl acetoacetal resin.

5 Claims, 1 Drawing Sheet

(51) Int. Cl.
*B41J 31/12* (2006.01)
*C08G 63/91* (2006.01)
*C08G 81/02* (2006.01)
*C08F 283/02* (2006.01)
*B41M 5/42* (2006.01)
*B41J 2/325* (2006.01)
*B41J 31/06* (2006.01)
*C09D 129/14* (2006.01)
*C09D 133/06* (2006.01)
*C09D 139/06* (2006.01)

(52) U.S. Cl.
CPC ............... *B41M 5/42* (2013.01); *B41M 5/44* (2013.01); *C08F 283/02* (2013.01); *C08G 63/91* (2013.01); *C08G 81/02* (2013.01); *C09D 129/14* (2013.01); *C09D 133/068* (2013.01); *C09D 139/06* (2013.01); *B41M 2205/02* (2013.01); *B41M 2205/06* (2013.01); *B41M 2205/30* (2013.01); *B41M 2205/38* (2013.01)

(56) References Cited

OTHER PUBLICATIONS

International Search Report with English language translation and Written Opinion issued in International Application No. PCT/JP2016/081457 dated Dec. 6, 2016.

THERMAL TRANSFER RECORDING MEDIUM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/081457, filed on Oct. 24, 2016, which is based upon and claims the benefit of priority to Japan Priority Application No. 2015-215565, filed on Nov. 2, 2015, the disclosures of which are all hereby incorporated herein by reference in their entireties.

TECHNICAL FIELD

The present invention relates to a thermal transfer recording medium.

BACKGROUND ART

Typically, a thermal transfer recording medium is called a thermal ribbon, and, for example, is used as the ink ribbon of a thermal transfer type printer.

As a conventional thermal transfer recording medium, there is the media described in PTLs 1 and 2. PTLs 1 and 2 describe a thermal transfer recording medium that includes a thermal transfer layer on one surface of a base material, and includes a heat-resistant lubricating layer (back coat layer) on the other surface of that base material. Here, the thermal transfer layer includes a layer (dye layer) that includes ink, and that ink is sublimated (sublimation transfer method) or melted (melt transfer method) by the heat generated by the thermal head of the printer, and transferred to the transfer-object.

Here, there are various demands on a thermal transfer recording medium such as high thermal transfer printing speed, high density and high quality of thermally transferred images, for example.

However, when the inventors performed printing with a high-speed sublimation transfer type printer using a thermal transfer recording medium as described in PTLs 1 and 2, sufficient print density was not obtained, abnormal transfer and the like occurred when performing thermal transfer at high temperature and high humidity, and it was not possible to obtain printed matter having a satisfactory quality with the conventional thermal transfer recording medium.

CITATION LIST

[Patent Literature] [PTL 1] JP H07-102746 B2; [PTL 2] JP 2005-231354 A

SUMMARY OF INVENTION

Technical Problem

Focusing on the points described above, the object of the present invention is to provide a thermal transfer recording medium that is capable of helping prevent the occurrence of abnormal transfer at high temperature and high humidity and improving the transfer sensitivity in printing.

Solution to Problem

According to an aspect of the present invention, a thermal transfer recording medium includes a heat-resistant lubricating layer on one surface of a base material, and an undercoat layer and a dye layer in that order on the other surface of the base material, wherein the undercoat layer includes a copolymer of a polyester having a sulfonic acid group and an acrylic polymer having at least one of a glycidyl group and a carboxyl group, polyvinylpyrrolidone, and an oxazoline group-containing polymer; and a binder resin of the dye layer is an acid-modified polyvinyl acetoacetal resin.

Effect of Invention

According to the above aspect of the present invention, the thermal sensitivity during high-speed printing can be improved, and the occurrence of abnormal transfer at high temperature and high humidity can be improved or even prevented.

DESCRIPTION OF EMBODIMENTS

In the following, an embodiment of the present invention will be explained with reference to the drawing. It is to be understood that the embodiment is intended to be representative of the present invention. The present invention is not necessarily limited to the description below.

Moreover, in the following detailed explanation, many specific details are described in order to provide a complete understanding of this embodiment of the present invention. However, it is clear that one or more embodiments are possible without such specific details. In addition, in order to simplify the drawing, illustrations of well-known structures and devices are omitted. Moreover, the drawing is a schematic diagram, so relationships between thicknesses and planar dimensions, ratios of the thicknesses of each of the layers, and the like may differ from the actual case.

(Thermal Transfer Recording Medium 1)

Figure 1:
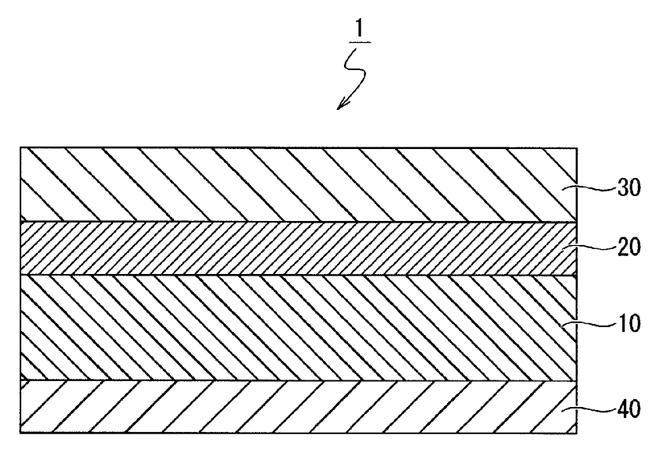
FIG. 1 is a schematic cross-sectional view illustrating the structure of a thermal transfer recording medium according to an embodiment of the present invention.

As illustrated in FIG. 1, the thermal transfer recording medium 1 according to an embodiment of the present invention is such that a heat-resistant lubricating layer 40 that provides lubrication with the thermal head is formed on one surface of a base material 10, and an undercoat layer 20 and a dye layer 30 are formed in this order on the other surface of the base material 10. These members will be explained in detail below.

(Base Material 10)

The base material 10 is required to have heat resistance and strength so as not to become soft and deform under heat and pressure during thermal transfer. Therefore, as the base material 10, it is possible, for example, to use singly or in combination a film of a synthetic resin such as polyethylene terephthalate, polyethylene naphthalate, polypropylene, cellophane, acetate, polycarbonate, polysulfone, polyimide, polyvinyl alcohol, aromatic polyamide, aramid, polystyrene and the like, paper such as condenser paper, paraffin paper and the like. Of these materials, in consideration of physical properties, workability, cost and the like, using polyethylene terephthalate film is preferred.

Moreover, in consideration of operability and workability, it is possible to use a base material 10 having a thickness that is within a range of no less than 2 µm and no greater than 50 µm. Within that range, taking into consideration handling properties such as transferability, and workability, a thickness within a range of no less than 2 μm and no greater than 9 μm is preferred.

Furthermore, of the base material 10, an adhesion treatment may be performed for at least one of the surface where the heat-resistant lubricating layer 40 is formed and the surface where the undercoat layer 20 is formed. As this adhesion treatment, it is possible, for example, to apply corona treatment, flame treatment, ozone treatment, ultraviolet treatment, radiation treatment, surface roughening treatment, plasma treatment, primer treatment, and like. It is also possible to use a combination of two or more of these treatments. By applying this adhesion treatment, the adhesion of the heat-resistant lubricating layer 40 or the undercoat layer 20 to the base material 10 can be increased.

(Undercoat Layer 20)

The undercoat layer 20 includes a copolymer of a polyester having a sulfonic acid group and an acrylic polymer having at least one of a glycidyl group and a carboxyl group, polyvinylpyrrolidone, and a polymer having an oxazoline group.

By forming the undercoat layer 20, and using acid-modified polyvinyl acetoacetal resin as the binder resin of the dye layer 30, high-density printing can be obtained without the occurrence of abnormal transfer at high temperature and high humidity, and without increasing the amount of dye that is used in the dye layer 30. This point will be explained in detail below. The polyester having a sulfonic acid group described above, for example, is a polyester having a sulfonic acid group in a side chain.

Here, "abnormal transfer" is a phenomenon in which the dye layer 30 peels from the base material 10 during thermal transfer, and the dye layer 30 and the transfer target become fused together.

For the undercoat layer 20, not only the prevention of abnormal transfer described above, but also a dye barrier property for improving transfer sensitivity, and also resistance to solvent for allowing the dye layer 30 that includes an ordinary solvent system to be layered on the undercoat layer 20 are required. Therefore, the main component of the undercoat layer 20 is a copolymer of a polyester having a sulfonic acid group and an acrylic polymer having at least one of a glycidyl group and a carboxyl group, polyvinylpyrrolidone, and a polymer having an oxazoline group.

Here, the "dye barrier property" means a property for blocking (preventing) the dye that is included in the dye layer 30 from diffusing into the base material 10 side. Moreover, the "main component" indicates that, as long as the effect of the present invention is not impaired, other components may be further added to a copolymer of a polyester having a sulfonic acid group and an acrylic polymer having at least one of a glycidyl group and a carboxyl group, polyvinylpyrrolidone, and a polymer having an oxazoline group, and means that the copolymer and polyvinylpyrrolidone mentioned above are included at an amount that is greater than 50% by mass of the entire undercoat layer. Here, the ratio that the aforementioned copolymer, polyvinylpyrrolidone and oxazoline group-containing polymer occupy in the undercoat layer 20 is preferably 90% by mass or more.

The polyester component having a sulfonic acid group that is included in the undercoat layer 20 is necessary in order to obtain adhesion with the base material 10 and solvent resistance. Moreover, the acrylic component having at least one of a glycidyl group and a carboxyl group that is included in the undercoat layer 20 is necessary in order to obtain a dye barrier property and solvent resistance. Here, when the respective components are simply blended, the miscibility between the acrylic component and the polyester component is poor, so there is a lack of stability as a material. Furthermore, adhesion to the base material 10 of the polyester component and the solvent resistance and dye barrier property of the acrylic component cannot both be obtained, which results in a decrease in performance when compared with the case in which each component is used alone. This is thought to be because incompatible sea-island structures are formed by blending polymers having poor miscibility, and the polyester component having an adhesion property, and the acrylic component having a dye barrier property exist locally (in other words, as viewed as an overall undercoat layer 20, there are locations having poor adhesion and locations having a poor dye barrier property).

However, by copolymerizing the acrylic component and the polyester component, the poor miscibility is improved. As a result, the acrylic component and the polyester component exist in the entire undercoat layer 20 without phase separation of the acrylic component and the polyester component, so the functions of the respective components (in other words, adhesion, solvent resistance and dye barrier property) are considered to be effectively expressed.

Details of the polyester component that is included in the undercoat layer 20 will be explained below.

A dicarboxylic acid component that is the copolymer component of polyester having a sulfonic acid group includes an ester-forming sulfonic acid alkali metal salt compound as an essential component, and examples include: aromatic dicarboxylic acids such as phthalic acid, terephthalic acid, dimethyl terephthalate, isophthalic acid, dimethyl isophthalic acid, 2,5-dimethyl terephthalic acid, 2,6-naphthalenedicarboxylic acid, biphenyldicarboxilic acid, orthophthalic acid and the like; aliphatic dicarboxylic acids such as succinic acid, adipic acid, azelaic acid, sebacic acid, dodecanedicarboxylic acid and the like; and alicyclic dicarboxylic acids such as cyclohexane dicarboxylic acid and the like.

As a dicarboxylic acid component other than the ester-forming sulfonic acid alkali metal salt compound, an aromatic dicarboxylic acid, for example, is preferred. This is because the aromatic nucleus of an aromatic dicarboxylic acid has a high affinity for hydrophobic plastic, and so improves adhesion and has excellent resistance to hydrolysis. In this embodiment, terephthalic acid and isophthalic acid are particularly preferred.

Moreover, as the ester-forming sulfonic acid alkali metal salt compound, examples include, for example: alkali metal salts (alkali metal salts of sulfonic acids) such as sulfoterephthalic acid, 5-sulfoisophthalic acid, 4-sulfoisophthalic acid, 4-sulfoisophthalic acid-2,7-dicarboxylic acid and the like, and ester-forming derivatives of these; however, using a sodium salt of 5-sulfoisophthalic acid, and ester-forming derivatives thereof is preferred. This is because solvent resistance is improved by having a sulfonic acid group.

A diglycol component that is the polyester copolymer component having a sulfonic acid group includes, for example, diethylene glycol, an aliphatic compound having 2 to 8 carbon atoms, or an alicyclic glycol having 6 to 12 atoms, and the like. Specific examples of an aliphatic compound having 2 to 8 carbon atoms or an alicyclic glycol having 6 to 12 atoms include: ethylene glycol, 1,3-propanediol, 1,2-propylene glycol, neopentyl glycol, 1,4-butanediol, 1,4-cyclohexanedimethanol, 1,3-cyclohexanedimethanol, 1,2-cyclohexanedimethanol, 1,6-hexanediol, p-xylylene glycol, triethylene glycol and the like; and these may be used singly or in combination of two or more.

Details of the acrylic component that is included in the undercoat layer 20 will be explained below.

Examples of the acrylic component that is included in the undercoat layer 20 include: a glycidyl group-containing radically polymerizable unsaturated monomer alone, or a carboxyl group-containing radically polymerizable unsaturated monomer alone, or another radically polymerizable unsaturated monomer that can be copolymerized with one of the monomers above.

In the present embodiment, either a glycidyl group-containing radically polymerizable unsaturated monomer or a carboxyl group-containing radically polymerizable unsaturated monomer is necessary. This is because a glycidyl group and a carboxyl group have poor miscibility with dye, and so have a dye barrier property. In other words, by including at least one of a glycidyl group and a carboxyl group, the transfer sensitivity is improved. Furthermore, for example, the solvent resistance to ketone solvents such as acetone, methyl ethyl ketone and the like, and to ester solvents such as ethyl acetate, butyl acetate and the like is improved.

Examples of a glycidyl group-containing radically polymerizable unsaturated monomer include: glycidyl ethers such as glycidyl acrylate, glycidyl methacrylate, allyl glycidyl ether, and the like.

Moreover, examples of the carboxyl group-containing radically polymerizable unsaturated monomer include acrylic acid, methacrylic acid, crotonic acid, itaconic acid, maleic acid, fumaric acid, 2-carboxyethyl(meth) acrylate, 2-carboxypropyl(meth) acrylate, 5-carboxypentyl(meth) acrylate, and the like.

Examples of the glycidyl group-containing or carboxyl group-containing radically polymerizable unsaturated monomer and copolymerizable radically polymerizable unsaturated monomer include, for example, vinyl ester, unsaturated carboxylic esters, unsaturated carboxylic amides, unsaturated nitriles, allyl compounds, nitrogen-containing vinyl monomers, hydrocarbon vinyl monomers or vinyl silane compounds.

Examples of the vinyl esters above include vinyl propionate, vinyl stearate, higher tertiary vinyl esters, vinyl chloride and vinyl bromide.

Moreover, examples of the unsaturated carboxylic acid esters above include methyl acrylate, ethyl acrylate, butyl acrylate, 2-ethylhexyl acrylate, methyl methacrylate, ethyl methacrylate, butyl methacrylate, butyl maleate, maleic acid octyl, butyl fumarate, octyl fumarate, hydroxyethyl methacrylate, hydroxyethyl acrylate, hydroxypropyl methacrylate, hydroxypropyl acrylate, dimethylaminoethyl methacrylate, dimethylaminoethyl acrylate, ethylene glycol dimethacrylate ester, ethylene glycol diacrylate ester, polyethylene glycol dimethacrylate ester, and polyethylene glycol diacrylate ester.

Furthermore, examples of the unsaturated carboxylic acid amides above include acrylamide, methacrylamide, methylol acrylamide, and butoxymethylol acrylamide.

Moreover, examples of the unsaturated nitrile above include acrylonitriles.

Examples of the allyl compounds above include allyl acetate, allyl methacrylate, allyl acrylate, and diallyl itaconate.

Moreover, examples of the nitrogen-containing vinyl monomers above include vinyl pyridine and vinyl imidazole.

Moreover, examples of the hydrocarbon vinyl monomers above include ethylene, propylene, hexene, octene, styrene, vinyl toluene and butadiene.

Furthermore, examples of the vinyl silane compounds above include dimethylvinylmethoxysilane, dimethylvinylethoxysilane, methylvinyldimethoxysilane, methylvinyldiethoxysilane, γ-methacryloxypropyltrimethoxysilane, and γ-methacryloxypropyldimethoxysilane.

The copolymerization ratio of polyester and acrylic polymer in the undercoat layer 20 is preferably in the range from 20:80 to 40:60 by mass ratio. This is because when the polyester component in the undercoat layer 20 is less than 20%, a high printing density is obtained, however, there is a tendency for adhesion with the base material 10 to become insufficient, and when the polyester component is greater than 40%, the adhesion increases, however, there is a tendency for the printing density to decrease.

The polyester that is included in the undercoat layer 20 can be obtained by a production method in which dicarboxylic acid and diglycol undergo a polycondensation reaction after undergoing an esterification or transesterification reaction.

Moreover, the production method for producing a copolymer of polyester and acrylic polymer included in the undercoat layer 20 is not limited at all. For example, in the case of emulsion polymerization, examples of the production method include a method of polymerization by emulsifying an acrylic monomer using a polyester dispersion or an aqueous solution, or a method of polymerization while dripping acrylic monomer into a polyester dispersion or an aqueous solution.

Details of the polyvinylpyrrolidone that is included in the undercoat layer 20 will be explained.

It is considered that the reason that the transfer sensitivity increases by including polyvinylpyrrolidone in a copolymer of polyester and acrylic polymer when compared with the cases in which both (in other words the copolymer and the polyvinylpyrrolidone) are used alone, as found by the inventors, is that the adsorption of dye is prevented by the presence of polyvinylpyrrolidone in the vicinity of the polyester moiety having a sulfonic acid group in the copolymer having a property of easily adsorbing dye.

Moreover, the composition ratio of the copolymer of polyester and acrylic polymer and the polyvinylpyrrolidone is preferably inside the range from 70:30 to 30:70 by mass ratio. This is because when the ratio of polyvinylpyrrolidone is less than 30%, it becomes difficult to obtain a high printing density, and when the ratio of polyvinylpyrrolidone is greater than 70%, it becomes difficult to obtain a high printing density and the storage stability is decreased. The decrease in the storage stability is derived from the hygroscopicity of the polyvinylpyrrolidone.

Examples of this polyvinylpyrrolidone include single polymers(homopolymers) of vinylpyrrolidone such as N-vinyl-2-pyrrolidone, N-vinyl-4-pyrrolidone and the like, or copolymers of these. Furthermore, examples may also include modified polyvinylpyrrolidone resin and the like. This modified polyvinylpyrrolidone resin, for example, is a copolymer of an N-vinylpyrrolidone monomer and another monomer. The copolymer form, for example, is not particularly limited and can be a random copolymer, a block copolymer, a graft copolymer and the like. Examples of the N-vinylpyrrolidone monomer above include N-vinylpyrrolidone(N-vinyl-2-pyrrolidone, N-vinyl-4-pyrrolidone, and the like) and derivatives thereof. Moreover, the derivatives thereof are not particularly limited, however, examples may include derivatives such as N-vinyl-3-methylpyrrolidone, N-vinyl-5-methylpyrrolidone, N-vinyl-3,3,5-trimethylpyrrolidone, N-vinyl-3-benzylpyrrolidone and the like having a substituent on the pyrrolidone ring.

Examples of a monomer component that is copolymerized with a N-vinylpyrrolidone monomer include a vinyl polymerizable monomer as described below. Examples of the monomer component include(meth) acrylic monomers such as(meth) acrylic acid, methyl(meth) acrylate, ethyl(meth) acrylate, isopropyl(meth) acrylate and the like, unsaturated carboxylic acids such as fumaric acid, maleic acid, itaconic acid and the like, vinyl caprolactam, ethylene, propylene, vinyl chloride, vinyl acetate, vinyl alcohol, styrene, vinyltoluene, divinylbenzene, vinylidene chloride, tetrafluoroethylene, vinylidene fluoride and the like.

The polyvinylpyrrolidone that is used in the undercoat layer 20 in the present embodiment preferably has a K value in the Fikentscher formula that is within the range from 30 to 100 inclusive. More preferably, the K value is within the range 60 to 90. When polyvinylpyrrolidone having a K value that is less than 30 is used, the effect of improving the transfer sensitivity in printing is reduced, and when using polyvinylpyrrolidone having a K value that is greater than 100, the viscosity of the coating solution increases, so the suitability for coating work is lowered, and thus neither is preferable.

In the following, details of the oxazoline group-containing polymer that is included in the undercoat layer 20 will be explained. By using a copolymer of polyester and acrylic polymer, and polyvinylpyrrolidone as the undercoat layer 20, transfer sensitivity can be obtained, however, the adhesion between the undercoat layer 20 and the dye layer 30 at high temperature and high humidity decreases, and abnormal transfer occurs.

Here, it is found that by including an oxazoline group-containing polymer in the undercoat layer 20, adhesion with the dye layer 30 that is made of an acid-modified polyvinyl acetoacetal resin as described later is improved without reducing the transfer sensitivity, and abnormal transfer at high temperature and high humidity can be prevented.

It is considered that the reason for this is that the oxazoline group of the oxazoline group-containing polymer and the acid-modified portion of the acid-modified polyvinyl acetoacetal and the glycidyl group or the carboxyl group included in the undercoat layer 20 respectively react with each other, which improves the adhesion between the undercoat layer 20 and the dye layer 30.

However, when polyisocyanate is included in the undercoat layer 20, the polyisocyanate reacts with the hydroxyl group that is included in the acid-modified polyvinyl acetoacetal resin, and although the same effect of improving the adhesion as when an oxazoline group-containing polymer is included might be expected, however, in actuality, the adhesion between the undercoat layer 20 and the dye layer 30 decreases.

This decrease in the adhesion is considered to occur because for the reactivity between polyisocyanates inside the undercoat layer 20 when forming the undercoat layer 20, or the reactivity with a copolymer of polyester and acrylic polymer is higher than the reactivity between the hydroxyl group and polyisocyanate included in the acid-modified polyvinyl acetoacetal resin, reaction with the acid-modified polyvinyl acetoacetal resin is difficult, and further, as the reaction inside the undercoat layer 20 advances, the wettability between the undercoat layer 20 and the dye layer 30 decreases.

Moreover, when the oxazoline group-containing polymer or polyisocyanate is included in the dye layer 30, the wettability of the undercoat layer 20 does not change and the reaction described above occurs at the interface, so adhesion is improved, however, since the reaction advances even inside the dye layer 30 and the heat resistance is improved, the thermal responsiveness at the time of printing deteriorates, leading to a decrease in transfer sensitivity.

The oxazoline group-containing polymer is a polymer having an oxazoline group inside the molecule, and can be made by polymerization of an additional polymerizable oxazoline group-containing monomer alone or with another monomer. Examples of the additional polymerizable oxazoline group-containing monomer include 2-vinyl-2-oxazoline, 2-vinyl-4-methyl-2-oxazoline, 2-vinyl-5-methyl-2-oxazoline, 2-isopropenyl-4-methyl-2-oxazoline, 2-isopropenyl-5-ethyl-2-oxazoline and the like; and these may be used singly or in combination of two or more. Of these, 2-isopropenyl-2-oxazoline is easily available industrially, and is suitable. Other monomers are not limited as long as the monomer is copolymerizable with the additional polymerizable oxazoline group-containing monomer, and examples may include (meth)acrylic esters such as(meth) acrylate (with a methyl group, ethyl group, n-propyl group, isopropyl group, n-butyl group, isobutyl group, t-butyl group, 2-ethylhexyl group, cyclohexyl group as the alkyl group); unsaturated carboxylic acids such as acrylic acid, methacrylic acid, itaconic acid, maleic acid, fumaric acid, crotonic acid, styrenesulfonic acid and salts of these acids (sodium salt, potassium salt, ammonium salt, tertiary amine salt and the like); unsaturated nitriles such as acrylonitrile, methacrylonitrile and the like; unsaturated amides such as (meth)acrylamide, N-alkyl(meth)acrylamide, N,N-dialkyl (meth)acrylamide, (with a methyl group, ethyl group, n-propyl group, isopropyl group, n-butyl group, isobutyl group, t-butyl group, 2-ethylhexyl group, cyclohexyl group, and the like as the alkyl group); vinyl esters such as vinyl acetate, vinyl propionate and the like; vinyl ethers such as methyl vinyl ether, ethyl vinyl ether and the like; α-olefins such as ethylene, propylene and the like; halogen-containing α,β-unsaturated monomers such as vinyl chloride, vinylidene chloride, vinyl fluoride and the like; and α,β-unsaturated aromatic monomers such as styrene, α-methylstyrene and the like; and these may be used singly or in combination of two or more.

As the oxazoline group-containing polymer, it is possible to use a commercially available product, and examples include products such as "Epocros WS-500", "Epocros WS-700", "Epocros K-2010E", "Epocros K-2020E", "Epocros K-2030E" and the like manufactured by Nippon Shokubai.

The oxazoline group-containing polymer is preferably 5% by mass to 20% by mass with respect to the solid content of the copolymer of polyester and acrylic polymer and the polypyrrolidone.

This is because when less than 5% by mass, adhesion between the undercoat layer 20 and the dye layer 30 remains unstable, and when greater than 20% by mass, there is a tendency for the transfer sensitivity to decrease.

The coating amount of the undercoat layer 20 after drying is not unconditionally limited, however, preferably is within the range of no less than 0.05 g/m$^2$ and no greater than 0.30 g/m$^2$. When the coating amount of the undercoat layer 20 after drying is less than 0.05 g/m$^2$, the transfer sensitivity during high-speed printing is insufficient due to deterioration of the undercoat layer 20 when laminating the dye layer 30, and there is a risk that there will be a problem with adhesion with the base material 10 or the dye layer 30.

However, when the coating amount of the undercoat layer 20 after drying is greater than 0.30 g/m$^2$, the sensitivity of the thermal transfer recording medium 1 itself does not change, and the printing density is saturated. Therefore, from the viewpoint of cost, preferably the coating amount is 0.30 g/m² or less.

Here, the coating amount of the undercoat layer 20 after drying is the amount of solids remaining after applying and drying the coating liquid for forming the undercoat layer. Moreover, the coating amount of the dye layer 30 after drying and the coating amount of the heat-resistant lubricating layer 40 after drying described layer are similarly the amounts of solids remaining after applying and drying the respective coating liquids.

(Dye Layer 30)

The dye layer 30 is formed by preparing a dye liquid for forming a dye layer by mixing together a heat-transferable dye material, a binder resin, a solvent and the like, and then coating and drying that coating liquid. The coating amount of the dye layer 30 after drying is suitably about 1.0 g/m². The dye layer 30 may be formed as a single layer of one color, or may be formed by repeatedly forming multiple layers that include dyes having different hues sequentially on the same surface of the same material.

The heat-transferable dye that is included in the dye layer 30 is not particularly limited as long as the dye melts, diffuses or sublimates with heat. As the yellow component of heat-transferrable dyes, it is possible, for example, to use Solvent Yellow 56, 16, 30, 93, 33, Disperse yellow 201, 231, 33 and the like. Moreover, examples of the magenta component include C.I. Disperse Red 60, C.I. Disperse Violet 26, C.I. Solvent Red 27, or C.I. Solvent Red 19 and the like. Furthermore, examples of the cyan component include C.I. Disperse Blue 354, C.I. Solvent Blue 63, C.I. Solvent Blue 36, or C.I. Disperse Blue 24 and the like. As black dye, dye toning by combining each of the dyes above is typical.

As the binder resin that is included in the dye layer 30, acid-modified polyvinyl acetoacetal resin is used. Here, the acid-modified polyvinyl acetoacetal resin in the present invention means a resin of which part of the polyvinyl acetoacetal is modified using an acid.

Examples of acid-modified polyvinyl acetoacetal resin include an epoxy-modified polyvinyl acetoacetal resin and a carboxyl group-modified polyvinyl acetoacetal resin, however, in the present embodiment, a carboxyl group-modified polyvinyl acetoacetal resin is more preferable.

This is because reactivity with the oxazoline group-containing polymer that is included in the undercoat layer is higher in the carboxyl group than in the epoxy group, and adhesion between the dye layer 30 and the undercoat layer 20 is more effective.

The ratio of acid modification is preferably in the range of 0.5 mol % to 10 mol % in terms of the vinyl alcohol unit in acid modified polyvinyl acetoacetal resin.

When the ratio of acid modification is too small, there is insufficient effect due to modification. However, when the ratio of acid modification is too large, it leads to a decrease in the solubility in an organic solvent, and to a decrease in storage stability of the dye due to an increase in water absorbency of the resin. Moreover, the remaining amount of a hydroxyl group in the acid-modified polyvinyl acetoacetal resin is preferably 20 to 30 mol % in terms of the vinyl alcohol unit in acid modified polyvinyl acetoacetal resin. When the remaining amount of hydroxyl group is too large, the solubility in organic solvent decreases, and the water absorbency excessively increases, which may cause the coating film strength of the dye layer 30 to decrease.

Furthermore, when the acetalization of the acid-modified polyvinyl acetoacetal resin is small, the solubility of the acid-modified polyvinyl acetoacetal resin in an organic solvent, or solubility in dye decreases, however when the acetalization is large, the coating film strength of the acid-modified polyvinyl acetoacetal resin decreases, so acetalization is preferably in the range of 50 to 80 mol %.

The molecular weight of the acid-modified polyvinyl acetoacetal resin can be appropriately selected according the dye or the like that is used, however, is preferably within the range of 80,000 to 130,000.

When the molecular weight is small, the coating film strength decreases, and when the molecular weight is high, the viscosity of the coating liquid increases and the coating suitability decreases, so is not preferred.

The acid-modified polyvinyl acetoacetal resin described above can be obtained by acetalizing acid-modified polyvinyl acetoalcohol using aldehyde, and acetalization can be performed by a conventionally known method.

For example, there is a method in which acetalization is performed by adding a necessary amount of aldehyde in order to give a specified degree of acetalization to acid-modified polyvinyl acetoacetal resin in the presence of an acid catalyst, followed by neutralization using alkali, and then drying.

Specific examples of aldehydes include formaldehyde, acetaldehyde, propionaldehyde, butyraldehyde, caproic aldehyde, capryl aldehyde, capric aldehyde, benzaldehyde, phenylacetaldehyde, ethylbenzaldehyde, chlorobenzaldehyde and the like; and of these, butylaldehyde and acetaldehyde are preferred. Two or more arbitrary kinds of aldehydes may be used in combination as necessary.

Examples of the acid catalyst that is used in the acetalization reaction include inorganic acids such as hydrochloric acid, sulfuric acid, phosphoric acid and the like, acetic acid, p-toluenesulfonic acid, and the like. Of these, hydrochloric acid, sulfuric acid and p-toluenesulfonic acid are preferred.

Here, the compounding ratio of the dye and binder resin in the dye layer 30, on a mass basis, is preferably (dye)/(binder resin)=10/100 to 300/100. This is because when the ratio of (dye)/(binder resin) is less than 10/100, there is too little dye and the coloring sensitivity becomes insufficient, and thus good thermal transfer cannot be obtained. Moreover, when this ratio is greater than 300/100, the solubility of dye to the binder resin is extremely reduced, so when forming a thermal sensitive transfer recording medium, the storage stability is deteriorated, and it becomes easy for the dye to precipitate out.

(Heat-Resistant Lubricating Layer 40)

The heat-resistant lubricating layer 40 is a layer that is formed, for example, by preparing a coating liquid for forming the heat-resistant lubricating layer by mixing together a binder resin, a functional additive that provides releasability and lubricity, a filler, a curing agent, a solvent and the like, then applying and drying that coating liquid. The coating amount of this heat-resistant lubricating layer 40 after drying is suitably in the range of no less than 0.1 g/m² and no greater than 2.0 g/m².

Examples of the binder resin that is included in the heat-resistant lubricating layer 40 include polyvinyl butyral resin, polyvinyl acetoacetal resin, polyester resin, vinyl chloride-vinyl acetate copolymer, polyether resin, polybutadiene resin, acrylic polyol, polyurethane acrylate, polyester acrylate, polyether acrylate, epoxy acrylate, nitrocellulose resin, cellulose acetate resin, polyamide resin, polyimide resin, polyamideimide resin, polycarbonate resin and the like.

Moreover, examples of the functional additive that is included in the heat-resistant lubricating layer 40 include surfactants such as natural waxes such as animal waxes, vegetable waxes and the like; synthetic waxes such as synthetic hydrocarbon waxes, aliphatic alcohols and acid waxes, fatty acid esters and glycerite series waxes, synthetic ketone type waxes, amine and amide type waxes, chlorinated hydrocarbon type waxes, aliphatic olefin type waxes and the like; higher fatty acid esters such as butyl stearate, ethyl oleate and the like; higher fatty acid metal salts such as sodium stearate, zinc stearate, calcium stearate, potassium stearate, magnesium stearate and the like; phosphate esters such as long chain alkyl phosphate esters, polyoxyalkylene alkyl aryl ether phosphate esters, or polyoxyalkylene alkyl ether phosphate esters and the like.

The filler that is included in the heat-resistant lubricating layer 40 is not particularly limited, however, examples include talc, silica, magnesium oxide, zinc oxide, calcium carbonate, magnesium carbonate, kaolin, clay, silicone particles, polyethylene resin particles, polypropylene resin particles, polystyrene resin particles, polymethyl methacrylate resin particles, polyurethane resin particles, and the like.

Moreover, examples of the curing agent that is included in the heat-resistant lubricating layer 40 include isocyanates such as tolylene diisocyanate, triphenylmethane triisocyanate, tetramethylxylene diisocyanate and the like, and derivatives thereof.

Advantageous Effect (1) According to the present embodiment, the thermal transfer recording medium 1 includes a heat-resistant lubricating layer 40 on one surface of a base material 10, and an undercoat layer 20 and a dye layer 30 in that order on the other surface of the base material 10, and the undercoat layer 20 is formed by a copolymer of a polyester having a sulfonic acid group and an acrylic polymer having at least one of a glycidyl group and a carboxyl group, a polyvinylpyrrolidone, and an oxazoline group-containing polymer, and the binder resin of the dye layer 30 is an acid-modified polyvinyl acetoacetal resin.

Therefore, the occurrence of abnormal transfer at high temperature and high humidity can be more suppressed, and the transfer sensitivity during high-speed printing can be increased without increasing the amount of dye used in the dye layer 30.

(2) Moreover, in the thermal transfer recording medium 1 according to the present embodiment, the acid-modified polyvinyl acetoacetal resin is a carboxyl group-modified polyvinyl acetoacetal resin.

Therefore, the adhesion force between the undercoat layer 20 and the dye layer 30 can be effectively increased, and the occurrence of abnormal transfer at high temperature and high humidity can be more suppressed.

(3) Furthermore, in the thermal transfer recording medium 1 according to the present embodiment, the K value of polyvinylpyrrolidone in the Fikentscher formula of polyvinylpyrrolidone is in the range of no less than 30 and no greater than 100.

Therefore, transfer sensitivity during high-speed printing can be increased, and the viscosity of the coating liquid becomes suitable, so the coating suitability can be better optimized.

(4) In addition, in the thermal transfer recording medium 1 according to the present embodiment, the copolymerization ratio of polyester and acrylic polymer is within the range from 20:80 to 40:60.

Therefore, the adhesion between the undercoat layer 20 and the base material 10 can be increased, and the printing density in high-speed printing can be increased.

(5) Moreover, in the thermal transfer recording medium 1 according to the present embodiment, the composition ratio of the copolymer and polyvinylpyrrolidone in terms of mass ratio is within the range from 70:30 to 30:70, and the oxazoline group-containing polymer is included in the range from 5% by mass to 20% by mass with respect to the overall amount of copolymer and polyvinylpyrrolidone.

Therefore, the printing density during high-speed printing can be further increased, and the occurrence of abnormal transfer at high temperature and high humidity can be more suppressed.

(6) Furthermore, in the thermal transfer recording medium 1 according to the present embodiment, an undercoat layer coating liquid is coated on the base material 10 and dried to form the undercoat layer 20, and the coating amount of that undercoat layer 20 after drying is within the range of no less than 0.05 $g/m^2$ and no greater than 0.30 $g/m^2$.

Therefore, the adhesion between the base material 10 or the dye layer 30 and the undercoat layer 20 can be increased, and sufficient printing density can be maintained even during high-speed printing. Moreover, it is possible to better prevent an increase in the manufacturing cost of the thermal transfer recording medium.

(Undercoat Layer Coating Layer)

The undercoat layer coating liquid for forming the aforementioned undercoat layer 20 will be described below.

The undercoat layer coating liquid that is used in this embodiment includes a copolymer of a polyester having a sulfonic acid group and an acrylic polymer having at least one of a glycidyl group and carboxyl group, a polyvinylpyrrolidone, and an oxazoline group-containing polymer.

Moreover, in this undercoat layer coating liquid, the K value of polyvinylpyrrolidone in the Fikentscher formula of polyvinylpyrrolidone is preferably in the range of no less than 30 and no greater than 100.

Furthermore, in this undercoat layer coating liquid, the copolymerization ratio between polyester and acrylic polymer in terms of the mass ratio is preferably within the range from 20:80 to 40:60.

In addition, in this undercoat layer coating liquid, the composition ratio between the copolymer of polyester and acrylic polymer and the polyvinylpyrrolidone in terms of mass ratio is preferably within the range from 70:30 to 30:70.

Moreover, an oxazoline group-containing polymer is preferably included within the range from 5% by mass to 20% by mass with respect to the solid content of the copolymer of polyester and acrylic polymer and the polyvinylpyrrolidone.

(Dye Layer Coating Liquid)

The dye layer coating liquid for forming the dye layer 30 described above will be explained below.

The dye layer coating liquid that is used in this embodiment includes a heat-transferable dye and an acid-modified polyvinylacetoacetal resin.

Moreover, in this dye layer coating liquid, the acid-modified polyvinylacetoacetal resin is preferably a carboxyl group-modified polyvinyl acetoacetal.

With the thermal transfer recording medium 1 that includes the undercoat layer 20 and dye layer 30 that are formed using the undercoat coating liquid and dye layer coating liquid described above, the occurrence of abnormal transfer at high temperature and high humidity can be suppressed, and the transfer sensitivity during high-speed printing can be increased without increasing the amount of dye that is used in the dye layer 30.

(Production Method)

The heat-resistant lubricating layer 40, the undercoat layer 20 and the dye layer 30 described above can each be formed by applying and drying the layers using a general coating method. Examples of a coating method for each layer include a gravure coating method, a screen printing method, a spray coating method and a reverse roll coating method.

EXAMPLES

The materials that are used in each of the examples and comparative examples of the present inventions are described below. In the description below, the term "parts", unless specified otherwise, refers to parts on a mass basis. Moreover, the present invention is not limited to the examples described below.

<Preparation of a Base Material with Heat-Resistant Lubricating Layer>

A 4.5 µm thick polyethylene terephthalate film was used as the base material, and a heat-resistant lubricating layer coating film having the composition described below was applied to one surface of the base material by a gravure coating method, so that the coating amount after drying became 1.0 g/m², and the coating liquid was then dried at 100° C. for one minute. After that, aging was performed for one week in a 40° C. environment to obtain a base material with a heat-resistant lubricating layer.

<Heat-Resistant Lubricating Layer Coating Liquid>

| | |
|---|---|
| Acrylic polyol resin | 12.5 parts |
| Polyoxyalkylene alkyl ether phosphate ester | 2.5 parts |
| Talc | 6.0 parts |
| 2,6-tolylene diisocyanate prepolymer | 4.0 parts |
| Toluene | 50.0 parts |
| Methyl ethyl ketone | 20.0 parts |
| Ethyl acetate | 5.0 parts |

<Method for Preparing Sulfonic Acid Group-Containing Polyester/Glycidyl Group-Containing Acrylic Copolymer>

Into a four-necked flask provided with a distillation tube, a nitrogen-introduction tube, a thermometer and a stirrer, 854 parts of dimethyl terephthalate, 355 parts of 5-sodium sulfoisophthalic acid, 186 parts of ethylene glycol, 742 parts of diethylene glycol, and 1 part of zinc acetate as a reaction catalyst were added.

Next, an esterification reaction was performed by heating these ingredients from 130° C. to 170° C. over a period of 2 hours, adding 1 part of antimony trioxide, and then raising the temperature from 170° C. to 200° C. over a period of 2 hours. After that, the temperature was gradually increased and the pressure was reduced until finally a polycondensation reaction was performed at a reaction temperature of 250° C. and in a vacuum of 1 mmHg or less for 1 to 2 hours to obtain polyester. The obtained polyester was dissolved in pure water, and then glycidyl methacrylate was added as a glycicyl group-containing acrylic monomer so that the mass ratio of polyester became 30:70, and potassium persulfate was further added as a polymerization initiator to prepare a monomer emulsion.

Next, pure water and the monomer emulsion above were put into a reaction vessel having a cooling tube, and nitrogen gas was blown into the reaction vessel for 20 minutes to sufficiently remove the oxygen. After that, the pure water and the monomer emulsion above were gradually heated for 1 hour, and a reaction was carried out for 3 hours while maintaining the temperature at 75 to 85° C. to obtain a sulfonic acid group-containing polyester/glycidyl group-containing acrylic copolymer. Moreover, by the same method, a sulfonic acid group-containing polyester/carboxyl group-containing copolymer, and a polyester acrylic copolymer of each polymerization ratio were obtained.

<Method for Preparing Acid-Modified Polyvinyl Acetoacetal Resin>

An aqueous solution was prepared by adding 100 g of itconic acid-modified polyvinyl alcohol resin (itaconic acid component: 6 mol %, degree of saponification: 98 mol %) to 1200 g of pure water, and stirring the mixture for approximately 2 hours at 90° C. Then, the obtained aqueous solution was cooled to 28° C., and 200 g of hydrochloric acid having a concentration of 35% by mass and 80 g of acetaldehyde were added to the aqueous solution. The aqueous solution was further cooled to 10° C. to cause an acetalization reaction. Next, the aqueous solution was heated to 30° C. and maintained at this temperature for 5 hours to complete the acetalization reaction. After that, neutralization, washing and drying were performed using a conventional method to obtain a carboxyl group-modified polyvinyl acetoacetal resin.

Then, this carboxyl group-modified polyvinyl acetoacetal resin was dissolved in DMSO-d6(dimethylsulfoxide) and the $^{13}$C-NMR spectrum was measured to calculate the composition and degree of acetalization of the acid-modified polyvinyl acetoacetal resin. It was found that the amount of the hydroxyl group was 25.2 mol %, the amount of the carboxyl group was 3 mol %, and the degree of acetalization was 70 mol %.

Moreover, the itaconic acid-modified polyvinyl alcohol resin was changed to epoxy-modified polyvinyl alcohol (epoxy group content: 3.0 mol %, saponification degree: 98 mol %) and epoxy-modified polyvinyl acetoacetal resin was then prepared by the same method.

The amount of hydroxyl group at that time was 26.0 mol %, the amount of epoxy group was 3.0 mol % and the degree of acetalization was 72 mol %.

Example 1

An undercoat layer was formed by applying an undercoat layer coating liquid—1 having the composition described below to the surface of the base material with a heat-resistant lubricating layer where the heat-resistant lubricating layer is coated using a gravure coating method so that the coating amount became 0.20 g/m², and drying the coating to dry for 2 minutes at 100° C. Next, a dye layer was formed by applying a dye layer coating liquid—1 having the composition described below on top of the undercoat layer by a gravure coating method so that the coating amount after drying became 0.70 g/m², and drying the coating for one minute at 90° C. In this way, the thermal transfer recording medium of Example 1 was obtained.

<Undercoat Layer Coating Liquid—1>

| | |
|---|---|
| Sulfonic acid group-containing polyester/glycidyl group-containing acrylic copolymer (30:70) | 2.50 parts |
| Polyvinylpyrrolidone (K value 60) | 2.50 parts |
| Oxazoline group-containing polymer | 0.50 parts |
| Pure water | 57.0 parts |
| Isopropyl alcohol | 37.5 parts |

<Dye Layer Coating Liquid—1>

| | |
|---|---|
| C.I. Solvent Blue 63 | 6.0 parts |
| Carboxyl group-modified polyvinyl acetoacetal resin | 4.0 parts |
| Toluene | 45.0 parts |
| Methly ethyl ketone | 45.0 parts |

Example 2

Except for using an undercoat layer coating liquid—2 having the following composition for the undercoat layer in the thermal transfer recording medium that was prepared in Example 1, the thermal transfer recording medium of Example 2 was obtained in the same way as in Example 1.

<Undercoat Layer Coating Liquid—2>

| | |
|---|---|
| Sulfonic acid group-containing polyester/glycidyl group-containing acrylic copolymer (30:70) | 2.50 parts |
| Polyvinylpyrrolidone (K value 30) | 2.50 parts |
| Oxazoline group-containing polymer | 0.50 parts |
| Pure water | 57.0 parts |
| Isopropyl alcohol | 37.5 parts |

Example 3

Except for using an undercoat layer coating liquid—3 having the following composition for the undercoat layer in the thermal transfer recording medium that was prepared in Example 1, the thermal transfer recording medium of Example 3 was obtained in the same way as in Example 1.

<Undercoat Layer Coating Liquid—3>

| | |
|---|---|
| Sulfonic acid group-containing polyester/glycidyl group-containing acrylic copolymer (30:70) | 2.50 parts |
| Polyvinylpyrrolidone (K value 90) | 2.50 parts |
| Oxazoline group-containing polymer | 0.50 parts |
| Pure water | 57.0 parts |
| Isopropyl alcohol | 37.5 parts |

Example 4

Except for using a dye layer coating liquid—2 having the following composition for the dye layer in the thermal transfer recording medium that was prepared in Example 1, the thermal transfer recording medium of Example 4 was obtained in the same way as in Example 1.

<Dye Layer Coating Liquid—2>

| | |
|---|---|
| C.I. Solvent Blue 63 | 6.0 parts |
| Epoxy modified polyvinyl acetoacetal resin | 4.0 parts |
| Toluene | 45.0 parts |
| Methly ethyl ketone | 45.0 parts |

Example 5

Except for using an undercoat layer coating liquid—4 having the following composition for the undercoat layer in the thermal transfer recording medium that was prepared in Example 1, the thermal transfer recording medium of Example 5 was obtained in the same way as in Example 1.

<Undercoat Layer Coating Liquid—4>

| | |
|---|---|
| Sulfonic acid group-containing polyester/glycidyl group-containing acrylic copolymer (30:70) | 1.00 parts |
| Polyvinylpyrrolidone (K value 60) | 4.00 parts |
| Oxazoline group-containing polymer | 0.50 parts |
| Pure water | 57.0 parts |
| Isopropyl alcohol | 37.5 parts |

Example 6

Except for using an undercoat layer coating liquid—5 having the following composition for the undercoat layer in the thermal transfer recording medium that was prepared in Example 1, the thermal transfer recording medium of Example 6 was obtained in the same way as in Example 1.

<Undercoat Layer Coating Liquid—5>

| | |
|---|---|
| Sulfonic acid group-containing polyester/glycidyl group-containing acrylic copolymer (30:70) | 1.50 parts |
| Polyvinylpyrrolidone (K value 60) | 3.50 parts |
| Oxazoline group-containing polymer | 0.50 parts |
| Pure water | 57.0 parts |
| Isopropyl alcohol | 37.5 parts |

Example 7

Except for using an undercoat layer coating liquid—6 having the following composition for the undercoat layer in the thermal transfer recording medium that was prepared in Example 1, the thermal transfer recording medium of Example 7 was obtained in the same way as in Example 1.

<Undercoat Layer Coating Liquid—6>

| | |
|---|---|
| Sulfonic acid group-containing polyester/glycidyl group-containing acrylic copolymer (30:70) | 3.50 parts |
| Polyvinylpyrrolidone (K value 60) | 1.50 parts |
| Oxazoline group-containing polymer | 0.50 parts |
| Pure water | 57.0 parts |
| Isopropyl alcohol | 37.5 parts |

Example 8

Except for using an undercoat layer coating liquid—7 having the following composition for the undercoat layer in the thermal transfer recording medium that was prepared in Example 1, the thermal transfer recording medium of Example 8 was obtained in the same way as in Example 1.

<Undercoat Layer Coating Liquid—7>

| | |
|---|---|
| Sulfonic acid group-containing polyester/glycidyl group-containing acrylic copolymer (30:70) | 4.00 parts |
| Polyvinylpyrrolidone (K value 60) | 1.00 parts |
| Oxazoline group-containing polymer | 0.50 parts |
| Pure water | 57.0 parts |
| Isopropyl alcohol | 37.5 parts |

Example 9

Except for using an undercoat layer coating liquid—8 having the following composition for the undercoat layer in the thermal transfer recording medium that was prepared in Example 1, the thermal transfer recording medium of Example 9 was obtained in the same way as in Example 1.

<Undercoat Layer Coating Liquid—8>

| | |
|---|---|
| Sulfonic acid group-containing polyester/glycidyl group-containing acrylic copolymer (10:90) | 2.50 parts |
| Polyvinylpyrrolidone (K value 60) | 2.50 parts |
| Oxazoline group-containing polymer | 0.50 parts |
| Pure water | 57.0 parts |
| Isopropyl alcohol | 37.5 parts |

Example 10

Except for using an undercoat layer coating liquid—9 having the following composition for the undercoat layer in the thermal transfer recording medium that was prepared in Example 1, the thermal transfer recording medium of Example 10 was obtained in the same way as in Example 1.

<Undercoat Layer Coating Liquid—9>

| | |
|---|---|
| Sulfonic acid group-containing polyester/glycidyl group-containing acrylic copolymer (20:80) | 2.50 parts |
| Polyvinylpyrrolidone (K value 60) | 2.50 parts |
| Oxazoline group-containing polymer | 0.50 parts |
| Pure water | 57.0 parts |
| Isopropyl alcohol | 37.5 parts |

Example 11

Except for using an undercoat layer coating liquid—10 having the following composition for the undercoat layer in the thermal transfer recording medium that was prepared in Example 1, the thermal transfer recording medium of Example 11 was obtained in the same way as in Example 1.

<Undercoat Layer Coating Liquid—10>

| | |
|---|---|
| Sulfonic acid group-containing polyester/glycidyl group-containing acrylic copolymer (40:60) | 2.50 parts |
| Polyvinylpyrrolidone (K value 60) | 2.50 parts |
| Oxazoline group-containing polymer | 0.50 parts |
| Pure water | 57.0 parts |
| Isopropyl alcohol | 37.5 parts |

Example 12

Except for using an undercoat layer coating liquid—11 having the following composition for the undercoat layer in the thermal transfer recording medium that was prepared in Example 1, the thermal transfer recording medium of Example 12 was obtained in the same way as in Example 1.

<Undercoat Layer Coating Liquid—11>

| | |
|---|---|
| Sulfonic acid group-containing polyester/glycidyl group-containing acrylic copolymer (80:20) | 2.50 parts |
| Polyvinylpyrrolidone (K value 60) | 2.50 parts |
| Oxazoline group-containing polymer | 0.50 parts |
| Pure water | 57.0 parts |
| Isopropyl alcohol | 37.5 parts |

Example 13

Except for using an undercoat layer coating liquid—12 having the following composition for the undercoat layer in the thermal transfer recording medium that was prepared in Example 1, the thermal transfer recording medium of Example 13 was obtained in the same way as in Example 1.

<Undercoat Layer Coating Liquid—12>

| | |
|---|---|
| Sulfonic acid group-containing polyester/glycidyl group-containing acrylic copolymer (30:70) | 2.50 parts |
| Polyvinylpyrrolidone (K value 60) | 2.50 parts |
| Oxazoline group-containing polymer | 0.50 parts |
| Pure water | 57.0 parts |
| Isopropyl alcohol | 37.5 parts |

Example 14

Except for forming the undercoat layer in the thermal transfer recording medium that was prepared in Example 1 by applying the undercoat layer coating liquid so that the coating amount after drying became 0.03 g/m$^2$, and then drying, the thermal transfer recording medium of Example 14 was obtained in the same way as in Example 1.

Example 15

Except for forming the undercoat layer in the thermal transfer recording medium that was prepared in Example 1 by applying the undercoat layer coating liquid so that the coating amount after drying became 0.35 g/m$^2$, and then drying, the thermal transfer recording medium of Example 15 was obtained in the same way as in Example 1.

Example 16

Except for using an undercoat layer coating liquid—13 having the following composition for the undercoat layer in the thermal transfer recording medium that was prepared in Example 1, the thermal transfer recording medium of Example 16 was obtained in the same way as in Example 1.

<Undercoat Layer Coating Liquid—13>

| | |
|---|---|
| Sulfonic acid group-containing polyester/glycidyl group-containing acrylic copolymer (30:70) | 2.500 parts |
| Polyvinylpyrrolidone (K value 60) | 2.500 parts |
| Oxazoline group-containing polymer | 0.150 parts |
| Pure water | 57.35 parts |
| Isopropyl alcohol | 37.50 parts |

Example 17

Except for using an undercoat layer coating liquid—14 having the following composition for the undercoat layer in the thermal transfer recording medium that was prepared in Example 1, the thermal transfer recording medium of Example 17 was obtained in the same way as in Example 1.

<Undercoat Layer Coating Liquid—14>

| | |
|---|---|
| Sulfonic acid group-containing polyester/glycidyl group-containing acrylic copolymer (30:70) | 2.500 parts |
| Polyvinylpyrrolidone (K value 60) | 2.500 parts |
| Oxazoline group-containing polymer | 1.250 parts |
| Pure water | 56.25 parts |
| Isopropyl alcohol | 37.50 parts |

Comparative Example 1

A dye layer was formed by applying a dye layer coating liquid that is the same as that of Example 1 to the surface of the base material with heat-resistant lubricating layer that is not coated with the heat-resistant lubricating layer without forming an undercoat layer so that the coating amount after drying became 0.7 g/m², and then drying. In this way, the thermal transfer recording medium of Comparative Example 1 was obtained.

Comparative Example 2

Except for using a dye layer coating liquid—3 having the following composition as the dye layer coating liquid, the thermal transfer recording medium of Comparative Example 2 was obtained in the same way as Example 1.
<Dye Layer Coating Liquid—3>

| C.I. Solvent Blue 63 | 6.0 parts |
| Polyvinyl acetoacetal resin | 4.0 parts |
| Toluene | 45.0 parts |
| Methly ethyl ketone | 45.0 parts |

Comparative Example 3

Except for using an undercoat layer coating liquid—15 having the following composition for the undercoat layer, the thermal transfer recording medium of Comparative Example 3 was obtained in the same way as in Example 1.
<Undercoat Layer Coating Liquid—15>

| Sulfonic acid group-containing polyester/glycidyl group-containing acrylic copolymer (30:70) | 2.50 parts |
| Polyvinylpyrrolidone (K value 60) | 2.50 parts |
| Polyisocyanate | 0.50 parts |
| Pure water | 57.0 parts |
| Isopropyl alcohol | 37.5 parts |

Comparative Example 4

Except for using an undercoat layer coating liquid—16 having the following composition for the undercoat layer, the thermal transfer recording medium of Comparative Example 4 was obtained in the same way as in Example 1.
<Undercoat Layer Coating Liquid—16>

| Sulfonic acid group-containing polyester/glycidyl group-containing acrylic copolymer (30:70) | 2.50 parts |
| Polyvinylpyrrolidone (K value 60) | 2.50 parts |
| Pure water | 57.0 parts |
| Isopropyl alcohol | 38.0 parts |

Comparative Example 5

Except for using an undercoat layer coating liquid—17 having the following composition for the undercoat layer, the thermal transfer recording medium of Comparative Example 5 was obtained in the same way as in Example 1.
<Undercoat Layer Coating Liquid—17>

| Sulfonic acid group-containing polyester/glycidyl group-containing acrylic copolymer (50:50) | 2.50 parts |
| Polyvinylpyrrolidone (K value 60) | 2.50 parts |
| Oxazoline group-containing polymer | 0.50 parts |
| Pure water | 57.0 parts |
| Isopropyl alcohol | 37.5 parts |

Comparative Example 6

Except for using an undercoat layer coating liquid—18 having the following composition for the undercoat layer, the thermal transfer recording medium of Comparative Example 6 was obtained in the same way as in Example 1.
<Undercoat Layer Coating Liquid—18>

| Sulfonic acid group-containing polyester/glycidyl group-containing acrylic copolymer (30:70) | 2.50 parts |
| Polyvinylpyrrolidone (K value 15) | 2.50 parts |
| Oxazoline group-containing polymer | 0.50 parts |
| Pure water | 57.0 parts |
| Isopropyl alcohol | 37.5 parts |

Comparative Example 7

Except for using an undercoat layer coating liquid—19 having the following composition for the undercoat layer, the thermal transfer recording medium of Comparative Example 7 was obtained in the same way as in Example 1.
<Undercoat Layer Coating Liquid—19>

| Polyvinylpyrrolidone (K value 15) | 5.00 parts |
| Pure water | 57.0 parts |
| Isopropyl alcohol | 38.0 parts |

Comparative Example 8

Except for using an undercoat layer coating liquid—20 having the following composition for the undercoat layer, the thermal transfer recording medium of Comparative Example 8 was obtained in the same way as in Example 1.
<Undercoat Layer Coating Liquid—20>

| Polyvinylpyrrolidone (K value 30) | 5.00 parts |
| Pure water | 57.0 parts |
| Isopropyl alcohol | 38.0 parts |

Comparative Example 9

Except for using an undercoat layer coating liquid—21 having the following composition for the undercoat layer, the thermal transfer recording medium of Comparative Example 9 was obtained in the same way as in Example 1.
<Undercoat Layer Coating Liquid—21>

| Polyvinylpyrrolidone (K value 90) | 5.00 parts |
| Pure water | 57.0 parts |
| Isopropyl alcohol | 38.0 parts |

Comparative Example 10

Except for using an undercoat layer coating liquid—22 having the following composition for the undercoat layer, the thermal transfer recording medium of Comparative Example 10 was obtained in the same way as in Example 1.

<Undercoat Layer Coating Liquid—22>

| Sulfonic acid group-containing polyester resin | 5.00 parts |
| Pure water | 47.5 parts |
| Isopropyl alcohol | 47.5 parts |

Comparative Example 11

Except for using an undercoat layer coating liquid—23 having the following composition for the undercoat layer in the thermal transfer recording medium that was prepared in Example 1, the thermal transfer recording medium of Comparative Example 11 was obtained in the same way as in Example 1.

<Undercoat Layer Coating Liquid—23>

| Glycidyl group-containing acrylic resin | 5.00 parts |
| Pure water | 75.0 parts |
| Isopropyl alcohol | 20.0 parts |

Comparative Example 12

Except for using an undercoat layer coating liquid—24 having the following composition for the undercoat layer, the thermal transfer recording medium of Comparative Example 12 was obtained in the same way as in Example 1.

<Undercoat Layer Coating Liquid—24>

| Sulfonic acid group-containing polyester/glycidyl group-containing acrylic copolymer (30:70) | 5.00 parts |
| Pure water | 57.0 parts |
| Isopropyl alcohol | 38.0 parts |

Comparative Example 13

Except for using an undercoat layer coating liquid—25 having the following composition for the undercoat layer in the thermal transfer recording medium that was prepared in Example 1, the thermal transfer recording medium of Comparative Example 13 was obtained in the same way as in Example 1.

<Undercoat Layer Coating Liquid—25>

| Glycidyl group-containing acrylic resin | 7.00 parts |
| Sulfonic acid group-containing polyester resin | 3.00 parts |
| Pure water | 45.0 parts |
| Isopropyl alcohol | 45.0 parts |

<Preparation of a Transfer Target>

A 188 μm white foam polyethylene terephthalate film was used as the base material, and an image receiving layer coating liquid having the following composition was applied to one surface of the base material by a gravure coating method so that the coating amount after drying became 5.0 g/m$^2$, and then dried. In this way, the transfer target for thermal transfer was prepared.

<Image Receiving Layer Coating Liquid>

| Vinyl chloride-vinyl acetate-vinyl alcohol copolymer | 19.5 parts |
| Amino-modified silicone oil | 0.5 parts |
| Toluene | 40.0 parts |
| Methyl ethyl ketone | 40.0 parts |

<Printing Evaluation>

Using the thermal transfer recording media of Examples 1 to 17 and Comparative Examples 1 to 13, beta printing was performed with a thermal simulator, and the maximum reflection density was evaluated. The results are presented in Table 1. The maximum reflection density is a value that was measured using an X-Rite 528.

The printing conditions are as follows:
Printing environment: 23° C., 50% RH
Applied voltage: 29 V
Line cycle: 0.9 msec
Printing density: Main scanning 300 dpi, sub scanning 300 dpi <Abnormal Transfer Evaluation>

In regard to the thermal transfer media of Examples 1 to 17 and Comparative Examples 1 to 13, thermal transfer media and a transfer target that were aged at room temperature were used, beta printing by a thermal simulator was performed in a 40° C. 90% environment, and whether or not there was abnormal transfer was evaluated. The results are given in Table 1.

The evaluation of abnormal transfer was performed according to the following criteria. A level of Δ or more is a practically acceptable level.

○: Abnormal transfer to the transfer target is not observed.
  Δ: Partial abnormal transfer to the transfer target is observed.
  x: Abnormal transfer to the transfer target is observed on the entire surface.

TABLE 1

| | Coating Amount of Undercoat Layer After Drying | Polyester-Acrylic Copolymerization Ratio (Mass Ratio) (A) | | | Polyvinyl pyrrolidone (PVP) K value | Polyester-acrylic copolymer:PVP (mass ratio) (B) | Oxazoline group-containing polymer (A)+(B) with respect to the total amount [solid content] | Isocyanate (A)+(B) with respect to the total amount [solid content] | Polyvinyl acetoacetal | | | Maximum reflection density (255/255) | Abnormal transfer (under 40° C, 90% environment) |
|---|---|---|---|---|---|---|---|---|---|---|---|---|---|
| | | Sulfonic acid group-containing polyester | Glycidyl group-containing acrylic | Carboxyl group-containing acrylic | | | | | Carboxyl group modified | Epoxy modified | Unmodified | | |
| Example 1 | 0.20 | 30 | 70 | — | 60 | 50:50 | 10 wt % | — | ○ | — | — | 2.51 | ○ |
| Example 2 | 0.20 | 30 | 70 | — | 30 | 50:50 | 10 wt % | — | ○ | — | — | 2.47 | ○ |
| Example 3 | 0.20 | 30 | 70 | — | 90 | 50:50 | 10 wt % | — | ○ | — | — | 2.54 | ○ |
| Example 4 | 0.20 | 30 | 70 | — | 60 | 20:80 | 10 wt % | — | ○ | — | — | 2.52 | △ |
| Example 5 | 0.20 | 30 | 70 | — | 60 | 30:70 | 10 wt % | — | — | ○ | — | 2.42 | ○ |
| Example 6 | 0.20 | 30 | 70 | — | 60 | 70:30 | 10 wt % | — | ○ | — | — | 2.45 | ○ |
| Example 7 | 0.20 | 30 | 70 | — | 60 | 80:20 | 10 wt % | — | ○ | — | — | 2.53 | △ |
| Example 8 | 0.20 | 10 | 90 | — | 60 | 50:50 | 10 wt % | — | ○ | — | — | 2.55 | △ |
| Example 9 | 0.20 | 20 | 80 | — | 60 | 50:50 | 10 wt % | — | ○ | — | — | 2.59 | △ |
| Example 10 | 0.20 | 40 | 60 | — | 60 | 50:50 | 10 wt % | — | ○ | — | — | 2.57 | ○ |
| Example 11 | 0.20 | 80 | 20 | — | 60 | 50:50 | 10 wt % | — | ○ | — | — | 2.49 | ○ |
| Example 12 | 0.20 | 30 | — | 70 | 60 | 50:50 | 10 wt % | — | ○ | — | — | 2.39 | ○ |
| Example 13 | 0.03 | 30 | 70 | — | 60 | 50:50 | 10 wt % | — | ○ | — | — | 2.48 | △ |
| Example 14 | 0.35 | 30 | 70 | — | 60 | 50:50 | 10 wt % | — | ○ | — | — | 2.45 | ○ |
| Example 15 | 0.20 | 30 | 70 | — | 60 | 50:50 | 3 wt % | — | ○ | — | — | 2.50 | ○ |
| Example 16 | 0.20 | 30 | 70 | — | 60 | 50:50 | 25 wt % | — | ○ | — | — | 2.51 | △ |
| Example 17 | 0.20 | 30 | 70 | — | — | — | — | — | ○ | — | — | 2.43 | ○ |
| Comparative Example 1 | — | — | — | — | — | — | — | — | — | — | — | 1.85 | × |
| Comparative Example 2 | 0.20 | 30 | 70 | — | 60 | 50:50 | 10 wt % | — | — | — | ○ | 2.50 | × |
| Comparative Example 3 | 0.20 | 30 | 70 | — | 60 | 50:50 | — | 10 wt % | ○ | — | — | 2.10 | × |
| Comparative Example 4 | 0.20 | 30 | 70 | — | 60 | 50:50 | 10 wt % | — | ○ | — | — | 2.52 | × |
| Comparative Example 5 | 0.20 | 50 | 50 | — | 60 | 50:50 | 10 wt % | — | ○ | — | — | 2.41 | ○ |
| Comparative Example 6 | 0.20 | 30 | 70 | — | 15 | 50:50 | 10 wt % | — | ○ | — | — | 2.35 | ○ |
| Comparative Example 7 | 0.20 | — | — | — | 15 | 0:100 | — | — | ○ | — | — | 2.04 | △ |
| Comparative Example 8 | 0.20 | — | — | — | 30 | 0:100 | — | — | ○ | — | — | 2.15 | △ |
| Comparative Example 9 | 0.20 | — | — | — | 90 | 0:100 | — | — | ○ | — | — | 2.25 | ○ |
| Comparative Example 10 | 0.20 | 100 | — | — | — | — | — | — | ○ | — | — | 1.80 | △ |

TABLE 1-continued

| | Coating Amount of Undercoat Layer After Drying | Polyester-Acrylic Copolymerization Ratio (Mass Ratio) (A) | | | Polyvinyl pyrrolid one (PVP) K value | Polyester-acrylic copolymer:PVP (mass ratio) (B) | Oxazoline group-containing polymer (A)+(B) with respect to the total amount [solid content] | Isocyanate (A)+(B) with respect to the total amount [solid content] | Polyvinyl acetoacetal | | | Maximum reflection density (255/255) | Abnormal transfer (under 40° C. 90% environment) |
|---|---|---|---|---|---|---|---|---|---|---|---|---|---|
| | | Sulfonic acid group-containing polyester | Glycidyl group-containing acrylic | Carboxyl group-containing acrylic | | | | | Carboxyl group modified | Epoxy modified | Unmodified | | |
| Comparative Example 11 | 0.20 | — | 100 | — | — | — | — | — | ○ | — | — | 2.45 | x |
| Comparative Example 12 | 0.20 | 30 | 70 | — | — | — | — | — | ○ | — | — | 2.41 | x |
| Comparative Example 13 | 0.20 | polyester/glycidyl group-containing acrylic blend (30/70) | | | — | — | — | — | ○ | — | — | 2.05 | x |

As can be seen from the results given in Table 1, it was found that in Examples 1 to 17 that used a copolymer of a polyester having a sulfonic acid group and an acrylic polymer having at least one of a glycidyl group and a carboxyl group, polyvinylpyrrolidone, and an oxazoline group-containing polymer for the undercoat layer, and used an acid-modified polyvinyl acetoacetal resin in the dye layer, when compared with Comparative Example 2 that did not use acid-modified polyvinyl acetoacetal resin in the dye layer and Comparative Example 4 that did not include an oxazoline group-containing polymer in the undercoat layer, there was no occurrence of abnormal transfer at high temperature and high humidity. Furthermore, in Comparative Example 3 that included polyisocyanate in the undercoat layer, not only did abnormal transfer occur, but also the transfer sensitivity decreased.

In addition, it was found that when comparing Example 1 in which a carboxyl group-modified acetoacetal resin was used and Example 4 in which an epoxy-modified polyvinyl acetoacetal resin was used, that adhesion in the case of Example 1 in which a carboxyl group-modified acetoacetal resin was used was better, and so a carboxyl group-modified acetoacetal resin is preferred.

Moreover, the copolymer of a sulfonic acid group-containing polyester and a glycidyl group-containing acrylic polymer of Comparative Example 12, when compared with Comparative Example 1 in which no undercoat layer is provided and Comparative Example 10 in which only a sulfonic acid group-containing polyester is used, and when compared with Comparative Example 13 in which a sulfonic acid group-containing polyester and a glycidyl group-containing acrylic polymer are simply mixed, was found to have higher transfer sensitivity in high-speed printing.

Furthermore, comparing Examples 1 to 17 in which polyvinylpyrrolidone is mixed with the polyester-acrylic copolymer and Comparative Example 12 that is a simple polyester-acrylic copolymer and with Comparative Examples 8 and 9 that are simply polyvinylpyrrolidone, it was confirmed that the maximum reflection density is improved by mixing in polyvinylpyrrolidone. From this, it was found that when polyvinylpyrrolidone is mixed in, the transfer sensitivity is increased.

It was also found that the larger the K value is of the polyvinylpyrrolidone that is mixed in, the more the transfer sensitivity is improved.

Moreover, when the ratio of polyvinylpyrrolidone is increased with respect to the polyester-acrylic copolymer, there is a tendency for the transfer sensitivity to decrease (refer to Examples 5 to 8). From this tendency, it was found that the preferred mixture ratio is when the copolymer of polyester and acrylic polymer and the polyvinylpyrrolidone have a mass ratio in the range from 70:30 to 30:70.

Furthermore, when the ratio of the oxazoline group-containing polymer decreases with respect to the polyester-acrylic copolymer and polyvinylpyrrolidone, there is a tendency for the adhesion to decrease, and when the ratio of the oxazoline group-containing polymer increases, there is a tendency for the transfer sensitivity to decrease (refer to Examples 16 and 17). From these tendencies, it was found that the preferred ratio is when the copolymer of polyester and acrylic polymer with respect to the polyvinylpyrrolidone is in the range 5% by mass to 10% by mass.

In addition, in the thermal transfer recording medium of Example 14, the coating amount of the undercoat layer is less than 0.05 g/m$^2$, so when compared with the thermal transfer recording medium of Example 1, a small decrease in the transfer sensitivity and decrease in the adhesion were confirmed.

Moreover, when similarly comparing the thermal transfer recording medium of Example 15 with the thermal transfer recording medium of Example 1, the coating amount of the undercoat layer is greater than 0.30 g/m$^2$, however, it was found that the thermal sensitivity and adhesion were mostly the same.

Here, the invention has been explained while referencing a limited number of embodiments, however, the scope of rights is not limited by these embodiments, and modifications to each of the embodiments based on the disclosure described above will be obvious to those skilled in the art.

Moreover, the embodiments are examples of the configuration for embodying the technical idea of the present invention, and the technical idea of the present invention does not specify the materials, shape, structure, arrangement and the like of the components. The technical idea of the present invention may undergo various modifications within the technical scope defined by the claims as stated in the claims.

INDUSTRIAL APPLICABILITY

The thermal transfer recording medium according to the present invention can be used in a sublimation transfer type printer, and as printers become faster and have more functions, various images can be easily formed in full color. Therefore, the present invention can be widely used in digital camera self-prints, cards such as identification cards and the like, outputted materials for amusement and the like.

REFERENCE SIGNS LIST

1: Thermal transfer recording medium; 10: Base material; 20: Undercoat layer; 30: Dye layer; 40: Heat-resistant lubricating layer

What is claimed is:

1. A thermal transfer recording medium, comprising:
a heat-resistant lubricating layer on one surface of a base material; and an undercoat layer and a dye layer in that order on the other surface of the base material,
wherein the undercoat layer includes
a copolymer of a polyester having a sulfonic acid group and an acrylic polymer having at least one of a glycidyl group and a carboxyl group, polyvinylpyrrolidone, and
an oxazoline group-containing polymer; and
a binder resin of the dye layer is a carboxyl group-modified polyvinyl acetoacetal resin or an epoxy modified polyvinyl acetoacetal resin.

2. The thermal transfer recording medium of claim 1, wherein a K value of the polyvinylpyrrolidone in the Fikentscher formula is within the range from 30 to 100 inclusive.

3. The thermal transfer recording medium of claim 1, wherein the copolymerization ratio of the polyester and the acrylic polymer is within the range from 20:80 to 40:60 by mass ratio.

4. The thermal transfer recording medium of claim 1, wherein the composition ratio of the copolymer and the polyvinylpyrrolidone is within the range from 70:30 to 30:70 by mass ratio; and the oxazoline group-containing polymer is contained at no less than 5% by mass and no more than 20% by mass with respect to the total amount of the copolymer and the polyvinylpyrrolidone.

5. The thermal transfer recording medium of claim 1, wherein the mass per unit area of the undercoat layer in the dry state is within the range of no less than 0.05 g/m$^2$ and no more than 0.30 g/m$^2$.

\* \* \* \* \*